United States Patent
Ohashi

(10) Patent No.: US 10,302,211 B2
(45) Date of Patent: May 28, 2019

(54) REGULATING VALVE WITH PLANETARY GEAR TRANSMISSION

(71) Applicant: Azbil Corporation, Tokyo (JP)

(72) Inventor: Tomofumi Ohashi, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 15/887,272

(22) Filed: Feb. 2, 2018

(65) Prior Publication Data

US 2018/0224020 A1    Aug. 9, 2018

(51) Int. Cl.
*F16H 1/28* (2006.01)
*F16K 31/04* (2006.01)
*F16K 31/53* (2006.01)

(52) U.S. Cl.
CPC .............. *F16K 31/045* (2013.01); *F16H 1/28* (2013.01); *F16K 31/535* (2013.01); *F16H 2001/2881* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,518,462 A | * | 5/1996 | Yach | F16H 37/041 251/129.11 |
| 2008/0105510 A1 | * | 5/2008 | Burlington | A47L 5/22 192/20 |
| 2010/0108925 A1 | * | 5/2010 | Kannoo | F16K 11/074 251/129.11 |
| 2015/0367839 A1 | * | 12/2015 | Murata | H02K 7/003 475/2 |
| 2017/0201154 A1 | * | 7/2017 | Brassitos | H02K 7/116 |
| 2018/0283218 A1 | * | 10/2018 | Slayter | F16H 1/28 |

FOREIGN PATENT DOCUMENTS

JP    H08-178119 A    7/1996
JP    2016-023684 A    2/2016

* cited by examiner

*Primary Examiner* — David J Hlavka
(74) *Attorney, Agent, or Firm* — Amster, Rothstein & Ebenstein LLP

(57) ABSTRACT

A setting/operating device includes a sun gear that rotates by receiving a rotating force from a motor; a first internal gear that has teeth on the inner peripheral surface thereof and is provided so as to surround the sun gear; a plurality of planetary gears that are engaged with the sun gear and the first internal gear and capable of rotating on axes thereof while revolving around the sun gear; a rotation mechanism that rotates by receiving rotating forces of the plurality of planetary gears; an output shaft that is coupled to the rotation mechanism; a rotation control member made of a material that expands in response to voltage application; and a housing in which the rotation control member is disposed in a gap between the first internal gear and the housing so as to make contact with the first internal gear and the housing.

6 Claims, 2 Drawing Sheets

REGULATING VALVE WITH PLANETARY GEAR TRANSMISSION

CROSS-REFERENCE TO RELATED APPLICATION

The present application claims the benefit of and priority to Japanese Patent Application No. 2017-018447, filed on Feb. 3, 2017, the entire contents of which are incorporated by reference herein.

TECHNICAL FIELD

The present invention relates to a setting/operating device for operating equipment and relates, for example, to a setting/operating device for operating a valve stem of a rotary-type regulating valve.

BACKGROUND ART

An electric setting/operating device (actuator) for operating a rotary-type regulating valve, such as a butterfly valve, drives a valve stem coupled to an output shaft by transmitting a rotating force generated from a driving motor to the output shaft via a gear mechanism.

Such a setting/operating device generally has an emergency shutoff function that closes the regulating valve when the supply of electric power is stopped by interruption of electric service or the like. A known electric setting/operating device having this emergency shutoff function is a spring return type setting/operating device that closes a regulating valve by forcibly rotating an output shaft using a spring unit provided separately from the above gear mechanism.

A driving motor of the electric setting/operating device generally has a detent torque. Accordingly, when the supply of electric power to the setting/operating device is stopped, it is difficult to rotate the gear mechanism coupled to the driving motor from the output shaft side using the torque from the spring unit. Therefore, a general spring return type setting/operating device has a clutch mechanism for disconnecting the coupling between the driving motor and the gear mechanism. However, in spring return operation that drives the output shaft using a torque from the spring unit in the state in which the coupling to the driving motor is disconnected by the clutch mechanism, the rotation speed of the output shaft is higher than in motor operation that drives the output shaft using the rotating force of the driving motor. Accordingly, when the rotation of the output shaft is stopped by return operation, a large impact (referred to below as a "return impact") is applied to gears included in the gear mechanism. Therefore, the conventional spring return type setting/operating device has a brake mechanism to reduce a return impact applied to gears, in addition to the clutch mechanism described above (see PTL 1 and PTL 2).

CITATION LIST

Patent Literature

[PTL 1] JP-A-8-178119
[PTL 2] JP-A-2016-023684

SUMMARY

However, in setting/operating devices that transmit a rotating force from the driving motor to the output shaft via a power transmitting mechanism including a gear mechanism having connected spur gears or a planetary gear mechanism as the setting/operating devices disclosed in PTL 1 and PTL 2, a return impact is applied to specific teeth of gears every time when the rotation of the output shaft is stopped by spring return operation. Accordingly, even if a return impact is reduced by installing a brake mechanism, a return impact is applied to the same teeth of a gear every time, and thus the service life of the setting/operating device is determined by the service life of the specific teeth. This problem also arises when a paradox planetary gear mechanism is adopted as the power transmitting mechanism of a setting/operating device.

In addition, when a clutch mechanism and a brake mechanism are installed as in the setting/operating devices disclosed in PTL 1 and PTL 2, there is a problem in that the structure of a setting/operating device is complicated and the size of the setting/operating device is large.

It is an object of the invention, which addresses the above problem, to prolong the service life of gears included in a power transmitting mechanism of an electric setting/operating device having a spring unit and to reduce the size of the electric setting/operating device.

A setting/operating device (100, 100A) according to the invention includes a driving motor (8); a sun gear (2) that rotates by receiving a rotating force from the driving motor; a first internal gear (3) that has teeth on the inner peripheral surface thereof and is provided so as to surround the sun gear; a plurality of planetary gears (4) that are disposed between the sun gear and the first internal gear, engaged with the sun gear and the first internal gear, and capable of rotating on axes thereof while revolving around the sun gear; a rotation mechanism (6, 13) that rotates by receiving rotating forces of the plurality of planetary gears; an output shaft (7) that is coupled to the rotation mechanism; a rotation control member (5) made of a material that expands in response to voltage application; and a housing (10) that accommodates the sun gear, the first internal gear, the plurality of planetary gears, the rotation mechanism, and the rotation control member, in which the rotation control member is disposed in a gap between the first internal gear and the housing so as to make contact with the first internal gear and the housing.

In the setting/operating device, the rotation control member may include a conductive polymer that expands in response to voltage application.

In the setting/operating device, the rotation mechanism may include a second internal gear (6) that has teeth to be engaged with the planetary gears on the inner peripheral surface thereof and is rotatably provided concentrically with the first internal gear.

In the setting/operating device, the rotation mechanism may include a carrier (13) that supports the plurality of planetary gears rotatably on the axes thereof and transmits the motion of revolution of the plurality of planetary gears to the output shaft.

In the above description, as an example, reference numerals in drawings corresponding to components of the invention are designated in parentheses.

As described above, according to the invention, it is possible to prolong the service life of gears included in the power transmitting mechanism of the electric setting/operating device having a spring unit and to reduce the size of the electric setting/operating device.

DETAILED DESCRIPTION

Figure 1:
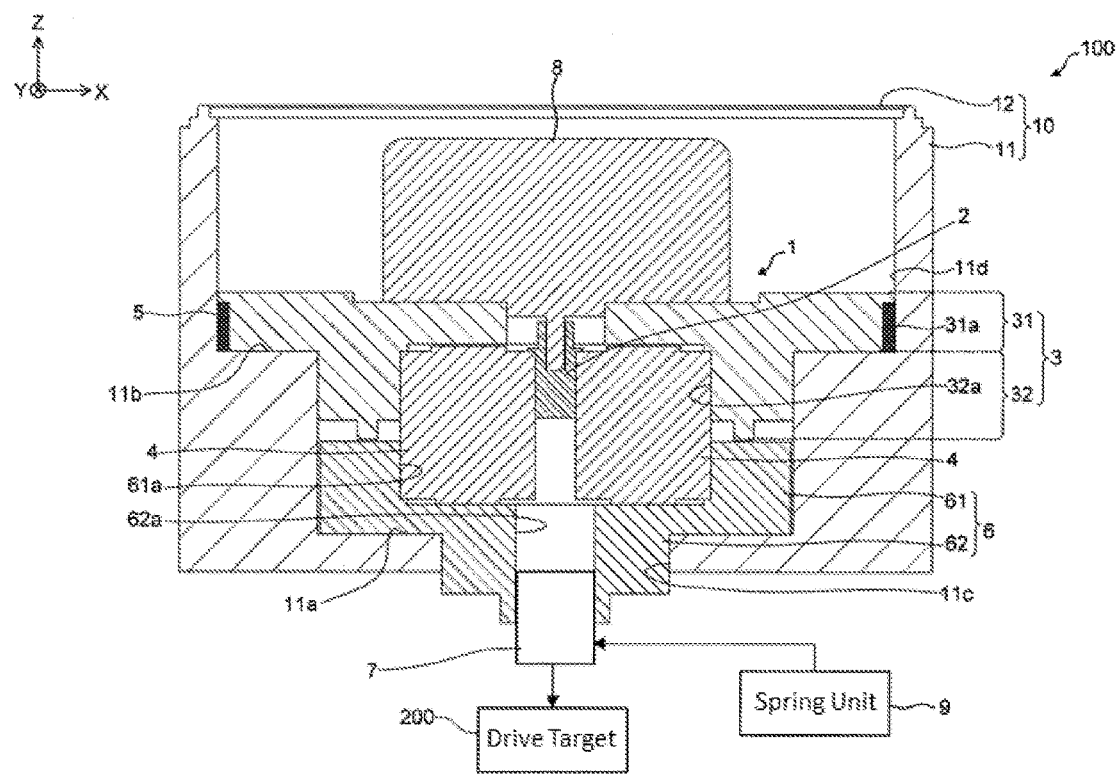
FIG. 1 is a cross-sectional view illustrating a power transmitting mechanism of a setting/operating device according to embodiment 1.

Embodiments of the invention will be described below with reference to the drawings. It should be noted that components common to the individual embodiments are given the same reference numerals to omit repeated descriptions.

Embodiment 1

FIG. 1 is a cross-sectional view illustrating the power transmitting mechanism of the setting/operating device according to embodiment 1.

The setting/operating device 100 according to embodiment 1 is, for example, an electric setting/operating device (actuator) that operates a rotary-type regulating valve, such as a butterfly valve, used for process control of a flow rate in a plant or the like. For example, the setting/operating device 100 controls the valve opening of a regulating valve by operating the valve stem based on an operation signal supplied from a positioner provided outside. In addition, the setting/operating device 100 has an emergency shutoff function that closes a regulating valve by spring return operation that drives the output shaft using a torque from a spring unit 9 during power-off.

Specifically, when electric power is supplied, the setting/operating device 100 transmits a rotating force from a driving motor 8 to the valve stem as a drive target 200 by suppressing the rotation of a first internal gear 3, which is one of the gears constituting a power transmission portion 1, so as to cause the power transmission portion 1 to function as a paradox planetary gear mechanism. In contrast, when electric power is not supplied, the setting/operating device 100 closes the regulating valve by allowing the rotation of the first internal gear 3 and thus integrally rotating a plurality of gears constituting the paradox planetary gear mechanism described above using an input torque from the spring unit 9 to operate the valve stem.

The specific structure of the setting/operating device 100 will be described in detail below.

In the embodiment, the detailed description and illustration of some components of the setting/operating device 100 are omitted to clarify the structure of the power transmitting mechanism of the setting/operating device 100. For example, the setting/operating device 100 has an electronic circuit portion that controls the rotation of the driving motor 8 based on an operation signal supplied from a positioner, a power supply unit, and the like in addition to the power transmitting mechanism, but the detailed description and illustration of these components are omitted in the embodiment.

As illustrated in FIG. 1, the setting/operating device 100 includes the driving motor 8, the power transmission portion 1, and the spring unit 9.

The driving motor 8 is a component that generates a rotating force for operating the valve stem as the drive target 200 when electric power is supplied to the setting/operating device 100 (during normal operation). The driving motor 8 is an electric motor for which rotation is controlled by supplying power via the electronic circuit portion (not illustrated) described above and the driving motor 8 is, for example, a brushless motor.

The power transmission portion 1 is a function portion that opens and closes the regulating valve by transmitting a rotating force from the driving motor 8 to the valve stem as the drive target 200.

The spring unit 9 is a function portion that closes the regulating valve by operating the valve stem when the supply of electric power to electronic components including the driving motor 8 of the setting/operating device 100 is stopped. The spring unit 9 is a setting/operating device having a spring member such as, for example, a spiral spring. Specifically, the spring unit 9 stores energy by winding the spring member while electric power is supplied to the driving motor 8 or the like and closes the regulating valve by releasing the energy stored in the spring member and driving an output shaft 7, which will be described later, of the power transmission portion 1 when the supply of electric power to the driving motor 8 or the like is stopped.

Next, the specific structure of the power transmission portion 1 will be described.

As illustrated in FIG. 1, the power transmission portion 1 includes a sun gear 2, the first internal gear 3, planetary gears 4, a rotation control member 5, a rotation mechanism 6, and the output shaft 7. These components and the driving motor 8 are accommodated in a housing 10.

The housing 10 is a container in which components of the setting/operating device 100 are accommodated and is made of, for example, a metal material. Specifically, as illustrated in FIG. 1, the housing 10 includes a box portion 11 and a lid portion 12 that covers an opening portion of the box portion 11.

The inside of the box portion 11 is machined according to the shapes of components to be accommodated. For example, as illustrated in FIG. 1, the box portion 11 has supporting surfaces 11a and 11b having different heights and a hole 11c.

The sun gear 2 is a gear component that rotates (rotates on the axis thereof) by receiving a rotating force from the driving motor 8. As illustrated in FIG. 1, one end of the sun gear 2 is coupled to the rotation shaft of the driving motor 8.

The first internal gear 3 is a gear component that is disposed so as to surround the sun gear 2, has teeth on the inner peripheral surface thereof, and is provided rotatably. Specifically, the first internal gear 3 includes an internal gear portion 32 and a supporting portion 31.

The internal gear portion 32 has teeth 32a to be engaged with the plurality of planetary gears 4, which will be described later, on the inner peripheral surface thereof. The internal gear portion 32 guides the rotation of the plurality of planetary gears 4. The supporting portion 31 supports the driving motor 8 and is rotatably placed on the supporting surface 11b of the box portion 11. The internal gear portion 32 and the supporting portion 31 are, for example, formed integrally with each other.

The planetary gears 4 are gear components that are engaged with the sun gear 2 and the first internal gear 3 and are capable of rotating on the axes thereof while revolving around the sun gear 2. In the setting/operating device 100, the plurality of (for example, three) planetary gears 4 is disposed between the sun gear 2 and the first internal gear 3. FIG. 1 illustrates the case in which the three planetary gears 4 are disposed between the sun gear 2 and the first internal gear 3 as an example.

The rotation mechanism 6 is a component that rotates by receiving rotating forces of the plurality of planetary gears 4. The rotation mechanism 6 is a second internal gear that has teeth to be engaged with the planetary gears 4 on the inner peripheral surface thereof and is rotatably provided concentrically with the first internal gear 3. This second internal gear functions as a movable internal gear that transmits the motion of the rotation and revolution of the plurality of the planetary gears 4 to the output shaft 7. The rotation mechanism 6 is also referred to below as the "second internal gear 6."

Specifically, the second internal gear 6 includes a gear portion 61 having teeth 61a to be engaged with the plurality of planetary gears 4 on the inner peripheral surface thereof and a supporting portion 62 that rotatably supports the plurality of planetary gears 4. The supporting portion 62 is rotatably placed on the supporting surface 11a of the box portion 11 in the state in which a part thereof projects from the hole 11c of the box portion 11. A hole 62a is formed in the supporting portion 62 and the output shaft 7 is inserted into the hole 62a.

The output shaft 7 is a component that rotates the valve stem of the regulating valve as the drive target 200 according to the rotating force of the second internal gear 6. Specifically, the output shaft 7 has one end inserted into and coupled to the hole 62a of the second internal gear 6 and the other end coupled to the valve stem as the drive target 200.

The sun gear 2, the first internal gear 3, the plurality of planetary gears 4, and the second internal gear 6 described above are made of, for example, a resin material such as plastic (for example, polyacetal resin).

The rotation control member 5 is a component that controls the rotatable state and the unrotatable state of the first internal gear 3. The rotation control member 5 is made of a material that expands in response to voltage application. For example, the rotation control member 5 is made of a conductive polymer that expands in response to voltage application. A known polymer used for artificial muscle can be cited as an example of the above conductive polymer.

The rotation control member 5 is disposed in the gap between the first internal gear 3 and the housing 10 so as to make contact with the first internal gear 3 and the housing 10. Specifically, as illustrated in FIG. 1, the rotation control member 5 is disposed in the gap between an inner wall 11d of the box portion 11 and an outer peripheral surface 31a of the supporting portion 31 of the first internal gear 3 on the supporting surface 11b of the box portion 11 and makes contact with the inner wall 11d and the outer peripheral surface 31a when a voltage is not applied (expansion is not made).

Although not illustrated, electrodes, interconnections, and the like for applying a voltage to the rotation control member 5 are disposed around the rotation control member 5 of the setting/operating device 100.

Next, the operation principle of the setting/operating device 100 will be described.

First, the case in which electric power is supplied to the setting/operating device 100 will be described.

When electric power is supplied to the setting/operating device 100, a voltage is applied to the rotation control member 5. As a result, the rotation control member 5 expands to increase the frictional force between the outer peripheral surface 31a of the first internal gear 3 and the rotation control member 5 and the frictional force between the inner wall 11d of the box portion 11 of the housing 10 and the rotation control member 5. Since the increase in the frictional forces allows the first internal gear 3 to be fixed to the housing 10 via the rotation control member 5, the first internal gear 3 is brought into the unrotatable state and functions as a fixed internal gear. That is, one paradox planetary gear mechanism (reducer) is achieved by the sun gear 2, the plurality of planetary gears 4, the first internal gear 3 (fixed internal gear), and the second internal gear (movable internal gear) 6.

When the rotation shaft of the driving motor 8 rotates in this state, the rotating force is transmitted to the sun gear 2 so that the sun gear 2 rotates. The rotating force of the sun gear 2 causes the plurality of planetary gears 4 engaged with the sun gear 2 to rotate on the axes thereof and revolve along the inner peripheral surface of the internal gear portion 32 while being engaged with the internal gear portion 32 of the first internal gear 3 as a fixed internal gear. The rotating forces of the plurality of planetary gears 4 rotate the second internal gear 6 as a movable internal gear engaged with the planetary gears 4. As a result, the output shaft 7 coupled to the second internal gear 6 rotates. When the valve stem is coupled to the output shaft 7, the valve opening of the regulating valve can be controlled by rotating the valve stem with a greatly reduced rotating force of the driving motor 8.

Next, the case in which the supply of electric power to the setting/operating device 100 is stopped will be described.

In this case, the supply of electric power to the driving motor 8 is stopped and the rotation of the sun gear 2 is stopped. In addition, the supply of a voltage to the rotation control member 5 is stopped and the rotation control member 5 shrinks. At this time, the rotation control member 5 is in contact with the outer peripheral surface 31a of the first internal gear 3 and the inner wall 11d of the box portion 11 of the housing 10, respectively, but the frictional force between the outer peripheral surface 31a of the first internal gear 3 and the rotation control member 5 and the frictional force between the inner wall 11d of the box portion 11 of the housing 10 and the rotation control member 5 become lower than that in the case in which a voltage is applied to the rotation control member 5. As a result, the first internal gear 3 enters the rotatable state.

When the energy stored in the spring member of the spring unit 9 is released and a torque is input from the spring unit 9 to the output shaft 7 in this state, a rotating force is applied from the output shaft 7 to the first internal gear 3 and the sun gear 2 via the second internal gear 6 and the plurality of planetary gears 4.

At this time, the sun gear 2 does not rotate because a force is applied to the sun gear 2 by the detent torque of the driving motor 8 in a direction in which the rotating force from the spring unit 9 is canceled. In contrast, the first internal gear 3 is in the rotatable state as described above.

Accordingly, when an input torque larger than the frictional force between the first internal gear 3 and the rotation control member 5 is applied from the spring unit 9 to the first internal gear 3 via the output shaft 7, the second internal gear 6, and the plurality of planetary gears 4, then the second internal gear 6, the plurality of planetary gears 4, and the first internal gear 3 integrally rotate around the sun gear 2. That is, since the first internal gear 3 enters the rotatable state, the self-lock function of the paradox planetary gear mechanism including the sun gear 2, the plurality of the planetary gears 4, the first internal gear 3, and the second internal gear 6 is released, thereby enabling the spring unit 9 to operate the output shaft 7 (valve stem). It should be noted that the net input torque is larger than the detent torque of the driving motor 8. Therefore, the sun gear 2 rotates and the planetary gears 4 do not rotate on the axes thereof at this time.

As described above, the rotation control member 5 shrinks during power-off to reduce the frictional force between the rotation control member 5 and the first internal gear 3, so that the first internal gear 3 enters the rotatable state and the input torque from the spring unit 9 causes the second internal gear 6, the plurality of planetary gears 4, and the first internal gear 3 to integrally rotate around the sun gear 2, which allows closing of the regulating valve.

When the regulating valve is closed by spring return operation in the setting/operating device 100 according to embodiment 1, the second internal gear 6, the plurality of planetary gears 4, and the first internal gear 3 receive a return impact as in the gear mechanism of the conventional setting/operating device. However, in the setting/operating device 100, the second internal gear 6, the plurality of planetary gears 4, and the first internal gear 3 integrally revolve around the sun gear 2 in the engagement state obtained during power-off when spring return operation is performed. Accordingly, the combination of teeth of the gears that receive a return impact depends on the engagement during power-off. The combination of gears during power-off is less likely to be constant every time. Accordingly, unlike the gear mechanism of the conventional setting/operating device in which particular teeth receive a return impact every time, the teeth that receive a return impact can be changed every time in the setting/operating device 100.

As described above, unlike the conventional spring return type setting/operating device in which the coupling between the driving motor 8 and the gear mechanism is disconnected, the setting/operating device 100 according to embodiment 1 has a clutch mechanism that switches between the rotatable state and the unrotatable state of the first internal gear 3 that functions as the fixed internal gear of the paradox planetary gear mechanism using the rotation control member 5 that expands or shrinks depending on whether voltage application is present or absent. With this, since the second internal gear 6, the plurality of planetary gears 4, and the first internal gear 3 integrally revolve around the sun gear 2 in the engagement state obtained during power-off in spring return operation during power-off as described above, the combination of teeth of the gears that receive a return impact can be changed every time. With this, it is possible to make the service life of gears included in the gear mechanism longer than in the electric setting/operating device having the conventional spring unit in which particular teeth receive a return impact every time during spring return operation.

In addition, the rotation control member 5 makes contact with the outer peripheral surface 31a of the first internal gear 3 and the inner wall 11d of the box portion 11 of the housing 10 even when a voltage is not applied. Therefore, the rotation control member 5 can function as a brake mechanism to reduce a return impact during spring return operation.

In addition, since the paradox planetary gear mechanism generally has a self-lock function that blocks rotation by an input torque from the output side, it is difficult to apply this mechanism as the power transmitting mechanism of a spring return type setting/operating device. However, the power transmission portion 1 according to the embodiment has a structure in which the rotation control member 5 switches the first internal gear 3, which functions as the fixed internal gear of the paradox planetary gear mechanism, from the unrotatable state to the rotatable state, which allows release of the self-lock function of the paradox planetary gear mechanism during power-off. Therefore, the power transmission portion 1 can be used as a power transmitting mechanism for spring return type setting/operating devices, which makes it possible to achieve spring return type setting/operating devices with a smaller size and lower cost.

In addition, using the rotation control member 5, the setting/operating device 100 according to embodiment 1 achieves a clutch mechanism and a brake mechanism for a conventional spring return type setting/operating device, so that the number of components and the size of the product can be reduced as compared with the conventional setting/operating device.

Embodiment 2

Figure 2:
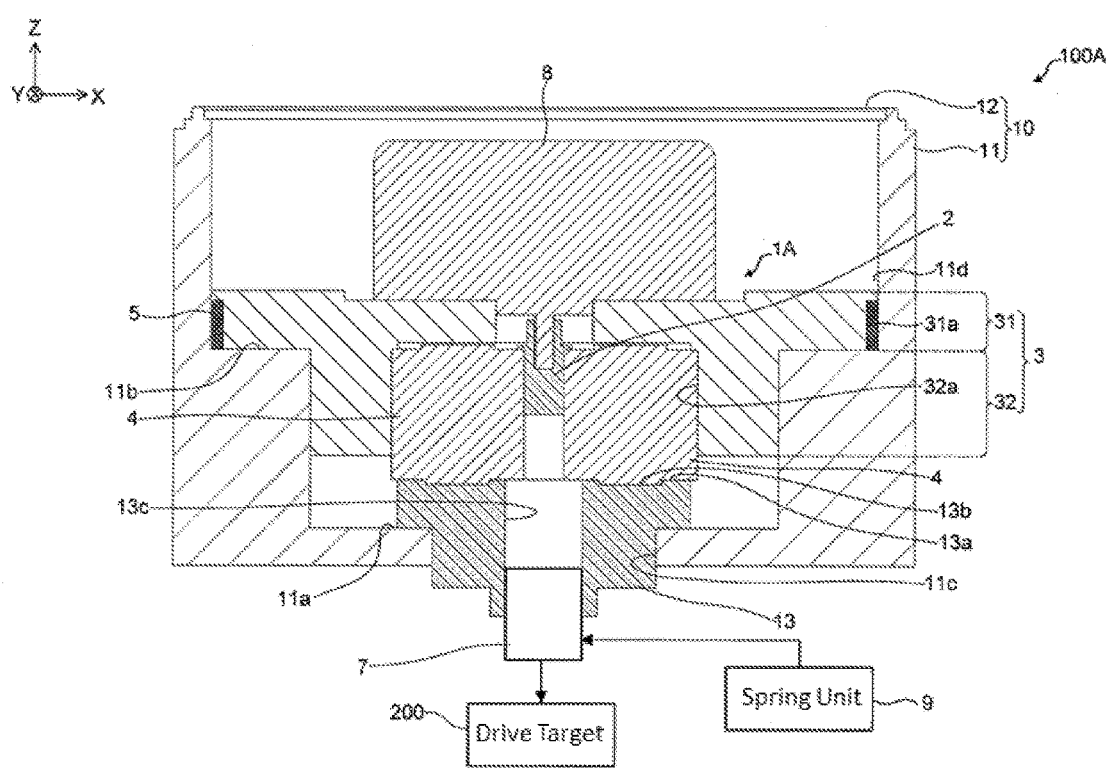
FIG. 2 is a cross-sectional view illustrating the power transmitting mechanism of the setting/operating device according to embodiment 2.

FIG. 2 is a cross-sectional view illustrating the power transmitting mechanism of the setting/operating device according to embodiment 2.

The setting/operating device 100A according to embodiment 2 is the same as the setting/operating device 100 according to embodiment 1 except that the setting/operating device 100A has a planetary gear mechanism as the power transmission portion.

Specifically, a power transmission portion 1A of the setting/operating device 100A has a carrier 13 that supports the plurality of planetary gears 4 rotatably on the axes thereof in place of the second internal gear 6 as the rotation mechanism and transmits the motion of revolution of the plurality of planetary gears 4 to the output shaft 7.

The carrier 13 is rotatably placed on the supporting surface 11a of the box portion 11 in the state in which a part thereof projects from the hole 11c of the box portion 11. The carrier 13 is disposed facing the first internal gear 3 via the plurality of planetary gears 4. Specifically, the carrier 13 and the first internal gear 3 rotatably clamp and hold the plurality of planetary gears 4 in the vertical direction. More specifically, the carrier 13 rotatably (revolvably) supports the plurality of planetary gears 4 on a supporting surface 13a thereof by inserting parts of the planetary gears 4 into a groove 13b formed on the supporting surface 13a of the carrier 13. In addition, a hole 13c is formed in the carrier 13 as in the second internal gear 6 according to embodiment 1, and the output shaft 7 is inserted into the hole 13c.

In the setting/operating device 100A according to embodiment 2, when electric power is supplied to the setting/operating device 100A, the first internal gear 3 is fixed to the housing 10 by expansion of the rotation control member 5 and enters the unrotatable state on the same principle as in the setting/operating device 100 according to embodiment 1. When the rotating force of the driving motor 8 is applied to the sun gear 2 in this state, the plurality of planetary gears 4 disposed around the sun gear 2 revolves around the sun gear 2 along the inner peripheral surface of the fixed first internal gear 3. The carrier 13 rotates concentrically with the sun gear 2 by receiving rotating forces of the planetary gears 4. As a result, the output shaft 7 coupled to the carrier 13 rotates to enable the valve stem to be operated.

In contrast, when the supply of electric power to the setting/operating device 100A is stopped, the frictional force between the first internal gear 3 and the rotation control member 5 is reduced and the first internal gear 3 enters the rotatable state on the same principle as in the setting/operating device 100 according to embodiment 1. In this state, when a torque larger than the frictional force between the first internal gear 3 and the rotation control member 5 is applied from the spring unit 9 to the first internal gear 3 via the output shaft 7, the carrier 13, and the plurality of planetary gears 4, then the carrier 13, the plurality of planetary gears 4, and the first internal gear 3 integrally rotate around the sun gear 2. As a result, the output shaft 7 rotates and the regulating valve is closed.

As described above, in the setting/operating device 100A according to embodiment 2, even when the planetary gear mechanism is adopted in place of the paradox planetary gear mechanism as a power transmission portion for transmitting the power of the driving motor to the valve stem, the service life of gears included in the planetary gear mechanism can be prolonged as in the setting/operating device 100 according to embodiment 1.

Expansion of Embodiments

Although the invention implemented by the inventors has been described above specifically based on embodiments, it will be appreciated that the invention is not limited to the embodiments and various modifications can be made without departing from the scope of the invention.

For example, although the driving motor 8 is directly coupled to the sun gear 2 in embodiments 1 and 2, the invention is not limited to these embodiments. For example, the driving motor 8 may be coupled to the sun gear 2 via a gear mechanism.

Although application of the setting/operating device 100 or 100A as a setting/operating device for operating the valve stem of the regulating valve has been illustrated in the above embodiments, the invention is not limited to the embodiments. For example, the setting/operating device 100 or 100A can also be applied as a setting/operating device that operates the damper shaft of a damper.

In addition, although components including the sun gear 2, the first internal gear 3, the plurality of planetary gears 4, and the second internal gear 6 are each made of a resin material in the embodiments described above, the invention is not limited to the embodiments, and the components may be made of other materials. For example, the components may each be made of a metal material (for example, a steel material).

Although the setting/operating device 100 or 100A is applied to a spring return type setting/operating device in the embodiments described above, the invention is not limited to the embodiments, and the setting/operating device 100 or 100A is applicable to a non-spring return type setting/operating device. For example, if the supply of electric power to the setting/operating device 100 is stopped when the setting/operating device 100 is used as a non-spring return type setting/operating device, the positions of engagement between the internal gear and the planetary gears can be changed periodically by integrally rotating a group of gears included in the paradox planetary gear mechanism (or the planetary gear mechanism) with manual operation. In this case, the combination of teeth to which a large load is applied when, for example, the regulating valve is fully closed can be changed periodically, so that the service life of gears can be prolonged.

DESCRIPTION OF REFERENCE NUMERALS AND SIGNS 100, 100A: setting/operating device; 1, 1A: power transmission portion; 2: sun gear; 3: first internal gear; 4: planetary gear; 5: rotation control member; 6: second internal gear (rotation mechanism); 7: output shaft; 8: driving motor; 9: spring unit; 10: housing; 11: box portion; 11a, 11b: supporting surface; 11c: hole; 11d: inner wall; 12: lid portion; 13: carrier (rotation mechanism); 13a: supporting surface; 13b: groove; 13c: hole; 31: supporting portion; 32: internal gear portion; 31a: outer peripheral surface of supporting portion 31; 32a, 61a: tooth; 61: gear portion; 62: supporting portion; 62a: hole; 200: drive target

The invention claimed is:

1. A setting/operating device comprising:
a driving motor;
a sun gear that rotates by receiving a rotating force from the driving motor;
a first internal gear that comprises teeth on an inner peripheral surface thereof and is disposed so as to surround the sun gear;
a plurality of planetary gears that are disposed between the sun gear and the first internal gear, engaged with the sun gear and the first internal gear, and capable of rotating on axes thereof while revolving around the sun gear, said axes of the plurality of planetary gears being parallel with one another;
a rotation mechanism that rotates by receiving rotating forces of the plurality of planetary gears;
an output shaft that is coupled to the rotation mechanism;
a rotation control member made of a material that expands in response to voltage application; and
a housing that accommodates the sun gear, the first internal gear, the plurality of planetary gears, the rotation mechanism, and the rotation control member,
wherein the rotation control member is disposed in a gap between the first internal gear and the housing so as to make contact with the first internal gear and the housing.

2. The setting/operating device according to claim 1, wherein the rotation control member comprises a conductive polymer that expands in response to voltage application.

3. The setting/operating device according to claim 2, wherein the rotation mechanism comprises a second internal gear that comprises teeth to be engaged with the planetary gears on an inner peripheral surface thereof and that is rotatably provided concentrically with the first internal gear.

4. The setting/operating device according to claim 2, wherein the rotation mechanism comprises a carrier that supports the plurality of planetary gears rotatably on the axes thereof and that transmits a motion of revolution of the plurality of planetary gears to the output shaft.

5. The setting/operating device according to claim 1, wherein the rotation mechanism comprises a second internal gear that comprises teeth to be engaged with the planetary gears on an inner peripheral surface thereof and that is rotatably provided concentrically with the first internal gear.

6. The setting/operating device according to claim 1, wherein the rotation mechanism comprises a carrier that supports the plurality of planetary gears rotatably on the axes thereof and that transmits a motion of revolution of the plurality of planetary gears to the output shaft.

* * * * *